(12) United States Patent
Marshall et al.

(10) Patent No.: US 8,435,333 B2
(45) Date of Patent: May 7, 2013

(54) PHOTO-SWITCHABLE MEMBRANE AND METHOD

(75) Inventors: Kenneth L. Marshall, Rochester, NY (US); Eric Glowacki, Marlboro, NJ (US)

(73) Assignee: University of Rochester, Rochester, NY (US)

( * ) Notice: Subject to any disclaimer, the term of this patent is extended or adjusted under 35 U.S.C. 154(b) by 97 days.

(21) Appl. No.: 13/195,508

(22) Filed: Aug. 1, 2011

(65) Prior Publication Data
US 2012/0025136 A1     Feb. 2, 2012

Related U.S. Application Data

(60) Provisional application No. 61/400,623, filed on Jul. 30, 2010.

(51) Int. Cl.
| | |
|---|---|
| *B01D 53/22* | (2006.01) |
| *C09K 19/30* | (2006.01) |
| *C09K 19/20* | (2006.01) |
| *C09K 19/12* | (2006.01) |
| *C09K 19/44* | (2006.01) |
| *C09K 19/60* | (2006.01) |
| *C09K 19/38* | (2006.01) |

(52) U.S. Cl.
USPC .... 96/14; 252/299.1; 252/299.5; 252/299.63; 252/299.66; 252/299.67; 252/299.68

(58) Field of Classification Search ............ 252/299.63, 252/299.66, 299.67, 299.68; 96/14
See application file for complete search history.

(56) References Cited

U.S. PATENT DOCUMENTS

| | | | |
|---|---|---|---|
| 6,849,203 B2* | 2/2005 | Farrand et al. ........... 252/299.01 |
| 6,939,479 B2* | 9/2005 | Farrand et al. ........... 252/299.63 |
| 7,745,538 B2* | 6/2010 | Seo ................................ 525/191 |
| 2007/0099249 A1* | 5/2007 | Abbott et al. .................. 435/7.5 |

OTHER PUBLICATIONS

Lin et al., "A Polarizer-Free Electro-Optical Switch Using Dye-Doped Liquid Crystal Gels", Materials 2009, 2, pp. 1662-1673.*

* cited by examiner

*Primary Examiner* — Shean C Wu
(74) *Attorney, Agent, or Firm* — William Greener; Bond, Schoeneck & King, PLLC

(57) ABSTRACT

Switchable gas permeation membranes in which a photo-switchable low-molecular-weight liquid crystalline (LC) material acts as the active element, and a method of making such membranes. Different LC eutectic mixtures were doped with mesogenic azo dyes and infused into track-etched porous membranes with regular cylindrical pores. Photo-induced isothermal phase changes in the imbibed mesogenic material afforded large, reversible changes in the permeability of the photo-switchable membrane to nitrogen. For example, membranes imbibed with a photo-switchable cyanobiphenyl LC material demonstrated low permeability in the nematic state, while the photo-generated isotropic state demonstrated a 16×-greater sorption coefficient. Both states obey a high linear sorption behavior in accordance with Henry's Law. In contrast, membranes imbibed with a photo-switchable phenyl benzoate LC material showed the opposite permeability behavior to the biphenyl-imbibed membrane, along with nonlinear sorption behavior.

19 Claims, 19 Drawing Sheets

PHOTO-SWITCHABLE MEMBRANE AND METHOD

CROSS-REFERENCE TO RELATED APPLICATIONS

The present application claims priority to U.S. Provisional Patent Application No. 61/400,623 entitled "Photoswitchable Membrane Apparatus and Method" filed on Jul. 30, 2010, the entire contents of which are incorporated herein by reference.

FEDERALLY SPONSORED RESEARCH OR DEVELOPMENT

The U.S. Government grant(s) relating to this invention that may be required to be set forth in this document are as follows: Award Grant No. DE-FC52-08NA28302 awarded by the United States Department of Energy. The United States government has certain rights in this invention.

BACKGROUND OF THE INVENTION

1. Field of the Invention

The invention relates to gas permeation membranes, and, more specifically, to switchable gas permeation membranes in which a photo-switchable low-molecular-weight liquid crystalline material acts as the active element.

2. Description of the Related Art

Polymeric membranes are currently the standard method used in many modern separation technologies. Their deployment in numerous separation processes accelerated in the 1970's as rising energy costs made energy-intensive cryogenic, thermal, and absorption-adsorption methods unattractive. Membranes based on polymeric materials operate isothermally and at low temperatures and can be tailored to provide good separation selectivity and high mass transfer (flux). Mechanisms involving flow through pores are wholly insufficient for the separation of gases such as the classic $N_2/O_2$ pair, which differ in molecular diameter by only 7%. Research in the field of high-performance gas permeation membranes has, to date, focused on maximizing both flux and selectivity. The development of membranes whose permeability can be controlled during operation or tuned to respond to changes in their environment is an important goal that has yet to be realized. Such "smart" materials are in high demand for smaller-scale membrane applications such as micro-analytic and reactor devices and biomedical membranes that can be used to control drug delivery or screening.

BRIEF SUMMARY OF THE INVENTION

An embodiment of the invention is directed to switchable gas permeation membranes in which a photo-switchable low-molecular-weight liquid crystalline ("LC") material acts as the active element.

Another embodiment of the invention is directed to LC eutectic mixtures that are doped with mesogenic azo dyes and infused into track-etched porous membranes with regular cylindrical pores. The membrane can be any material sufficiently porous and chemically compatible with the LC material, including but not limited to, polycarbonate, polyester, and polyimide membranes. In an aspect, the membrane can be track-etched and have sufficient transparency between approximately 300 to 600 nm to allow photo-switching of the LC mixture to take place.

Accordingly, an aspect of the invention provides a photo-switchable gas permeation membrane comprising a eutectic mixture composed of two or more liquid crystalline compounds and a mesogenic azobenzene dye, wherein the permeability of the membrane to gas is photo-switchable between a first state and a second state. In one embodiment, the membrane is more permeable to gas in the second state than in the first state.

Another aspect of the invention provides a liquid crystalline compound comprising: (i) a cyanobiphenyl compound; (ii) a phenyl benzoate compound; (iii) other known LC compounds; or (iv) a mixture thereof. For example, the cyanobiphenyl compound can be 4-cyano-4'-n-pentylbiphenyl, 4-cyano-4'-n-heptylbiphenyl, 4-cyano-4'-n-oxyoctylbiphenyl, 4-cyano-4'-n-pentyl-p-terphenyl, or a mixture thereof. The phenyl benzoate compound can be, for example, 4-n-pentylphenyl-4'-methoxybenzoate, 4-n-pentylphenyl-4'-n-pentyloxybenzoate, or a mixture thereof.

Another aspect of the invention provides a mesogenic azobenzene dye comprising: (i) 4-butyl-4'-methoxyazobenzene; (ii) 4-ethoxy-4'-hexanoylazobenzene; and (iii) mixtures thereof. In one embodiment, the mesogenic azobenzene dye comprises approximately 10-20% w/w of the liquid crystalline mixture.

Another aspect of the invention provides the photo-switchable gas permeation membrane, wherein the membrane comprises, for example, a polycarbonate membrane. In one embodiment, the eutectic liquid crystalline mixture is imbibed in a pre-existing porous membrane structure, while in another embodiment the photo-switchable LC permeation membrane is formed by dispersing a liquid crystalline mixture into a host polymer solution and casting the mixture onto a substrate or release sheet and curing to form a polymer-dispersed liquid crystal membrane. In one embodiment, the liquid crystalline mixture and the host polymer solution are mixed at a ratio of approximately 60:40 w/w. In yet another embodiment, the pores of the photo-switchable gas permeation membrane are treated with n-octyltriethoxylsilane ("OTS") to control and alter the alignment of the LC molecules within the pores.

Yet another aspect of the invention provides a method of making a photo-switchable gas permeation membrane. The method comprises the step of adding a mixture of a liquid crystalline compound or compounds and a mesogenic azobenzene dye to a gas permeable membrane, wherein after adding the mixture to the membrane, the permeability of the membrane to gas is photo-switchable between a first state and a second state. The liquid crystalline compound or compounds can be any of the suitable compounds listed herein or known in the art, for example, while the mesogenic azobenzene dye can similarly be any of the suitable compounds listed herein or known in the art. In one embodiment, the LC mixture is added by dispersing the mixture into a host polymer solution and casting the solution as a polymer-dispersed liquid crystal membrane.

BRIEF DESCRIPTION OF THE SEVERAL VIEWS OF THE DRAWING(S)

The present invention will be more fully understood and appreciated by reading the following Detailed Description in conjunction with the accompanying drawings, in which.

Figure 7:
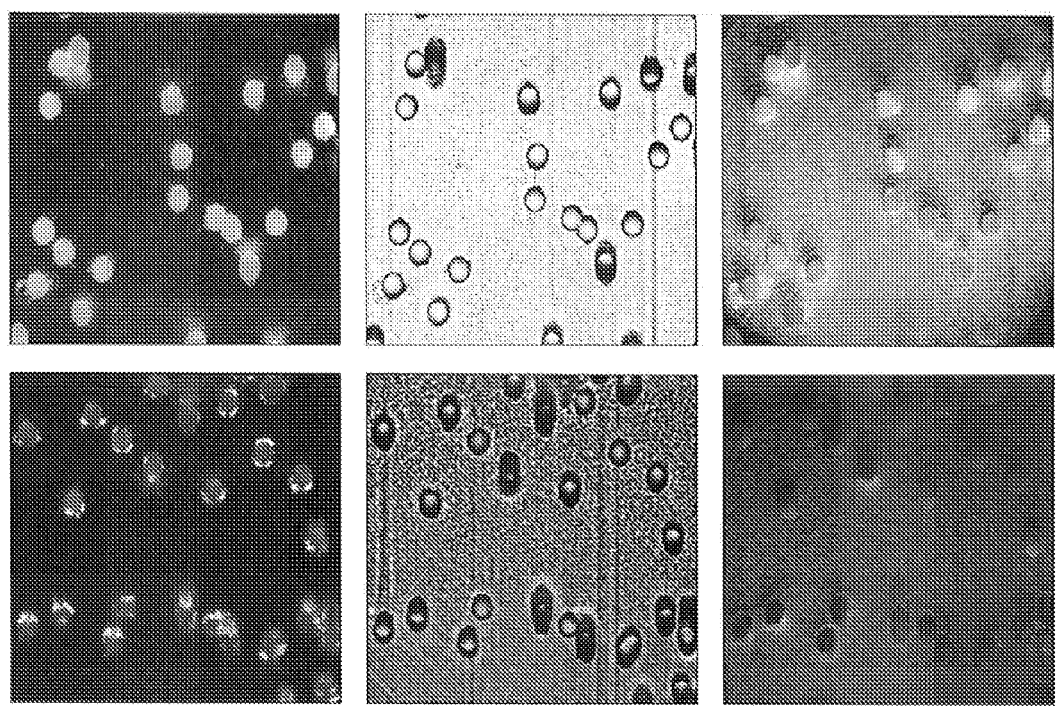
Figure 8:
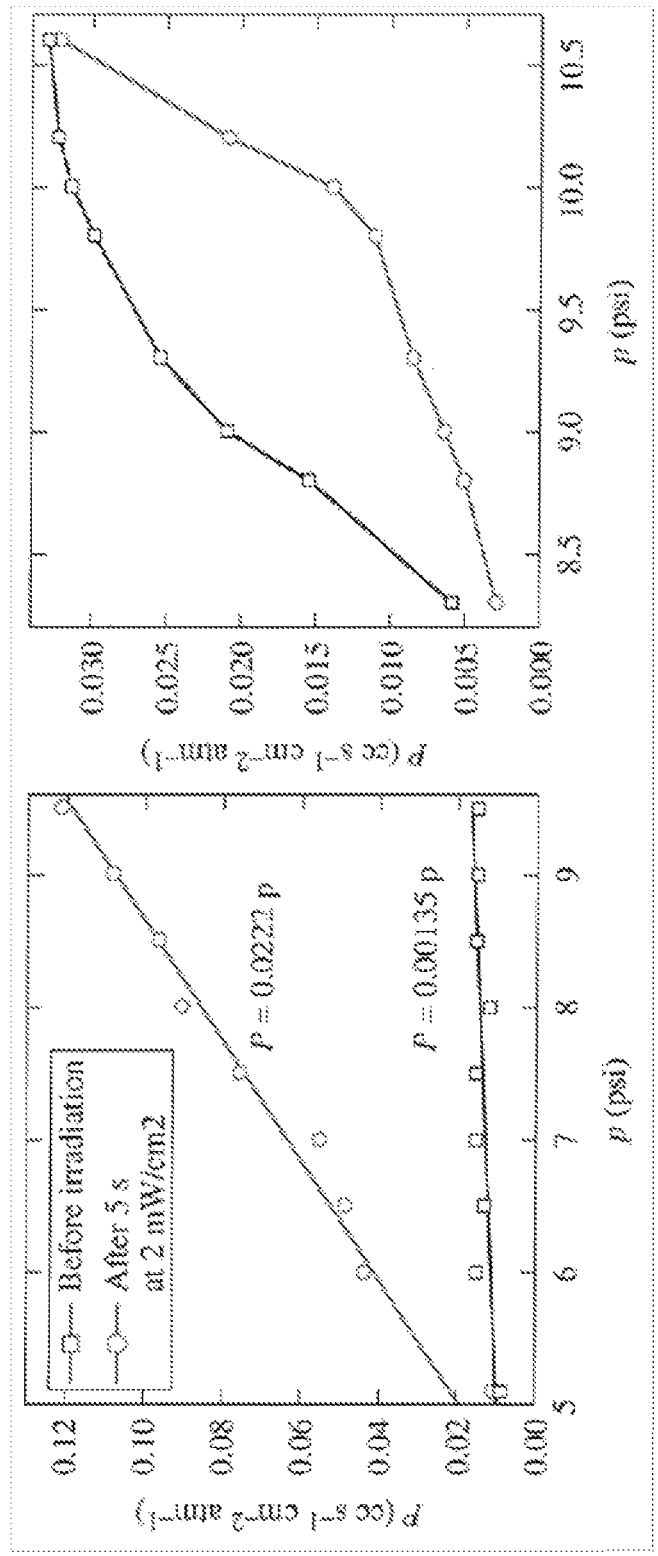
Figure 9:
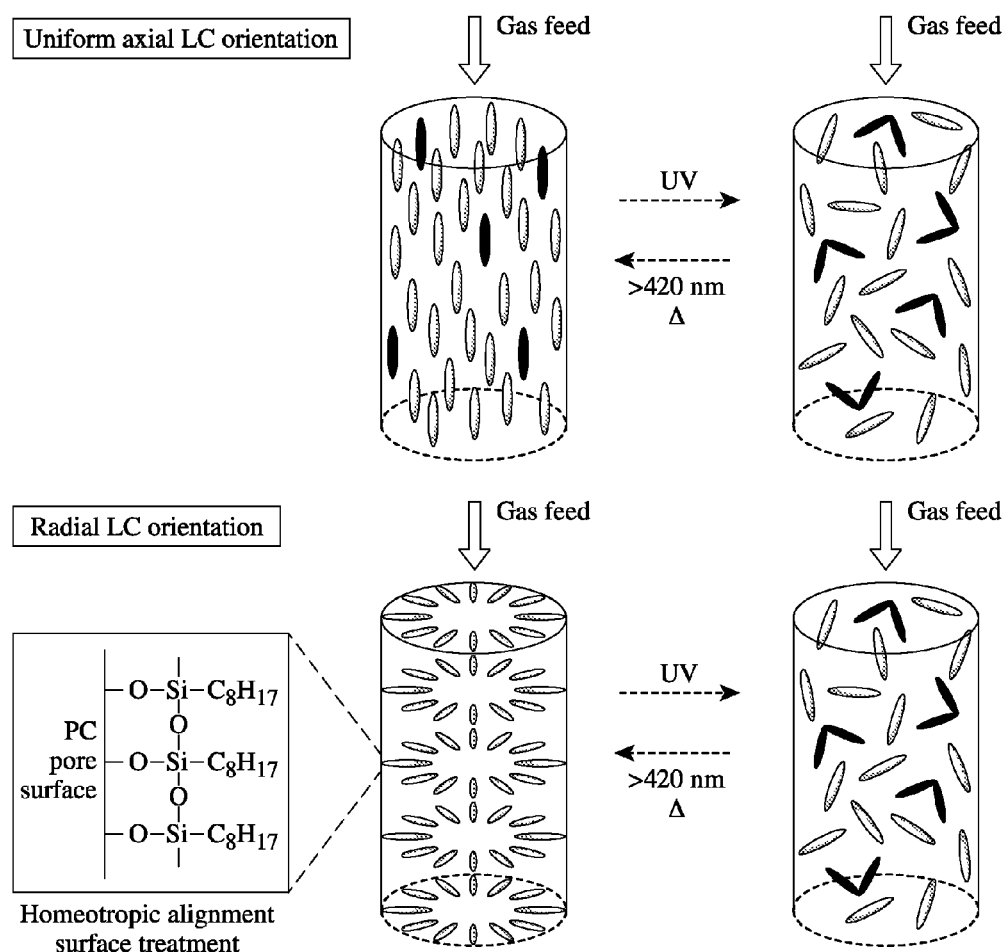
Figure 10:
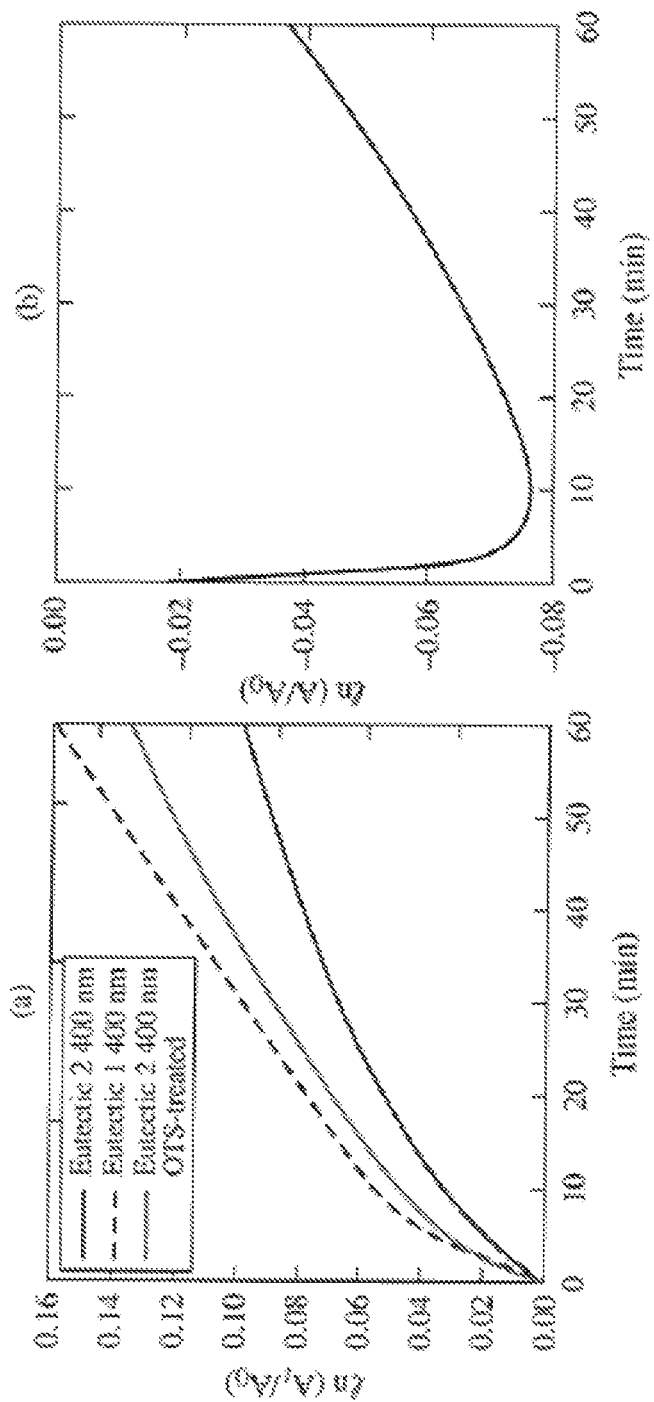
Figure 11:
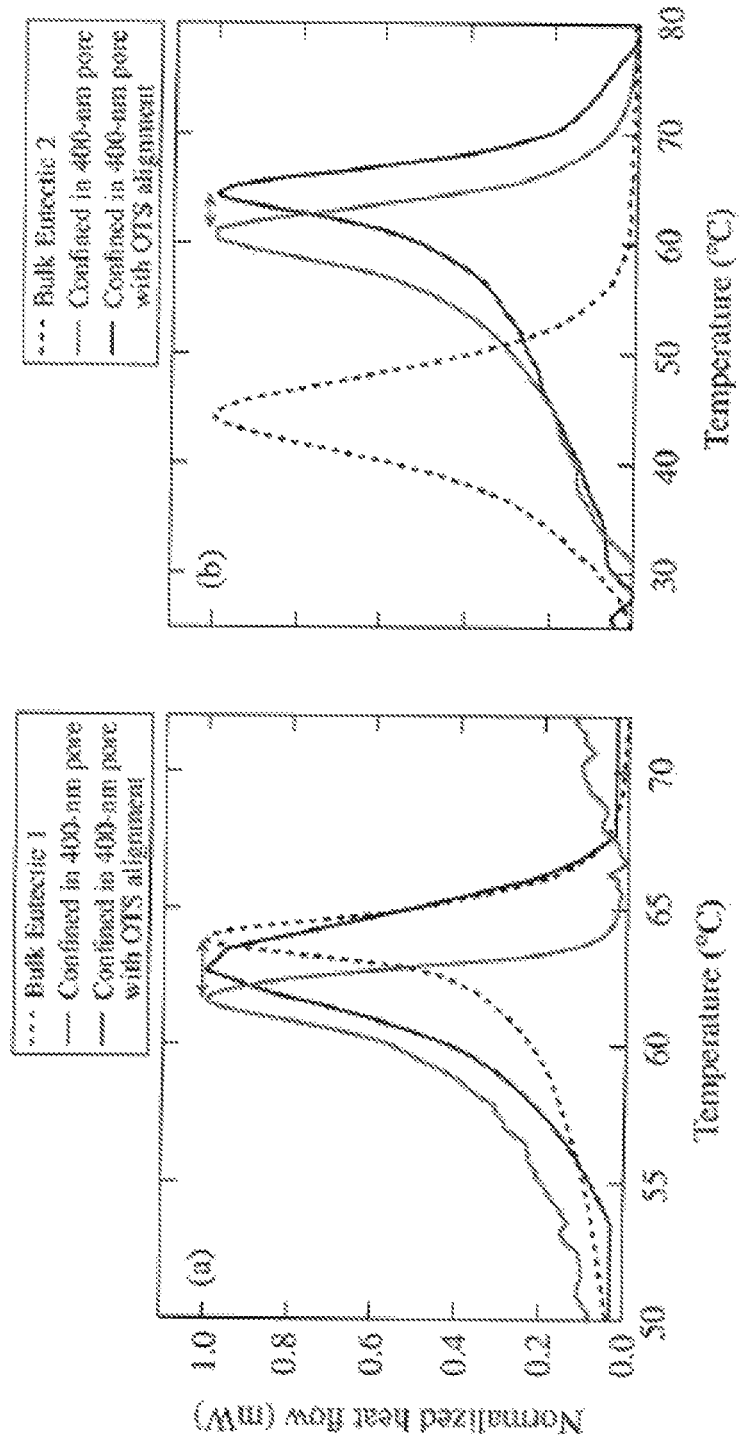
Figure 12:
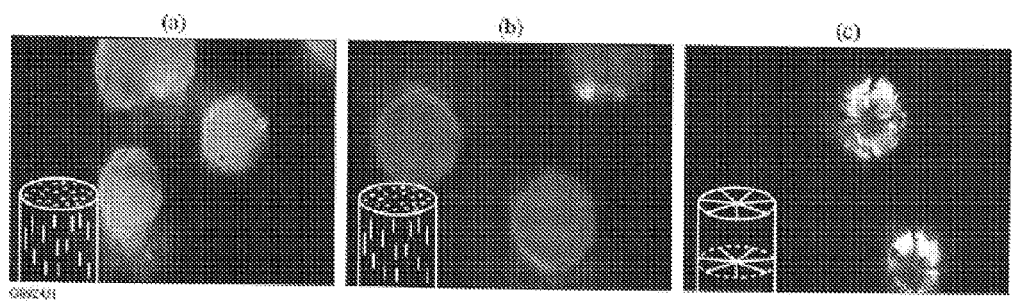
Figure 13:
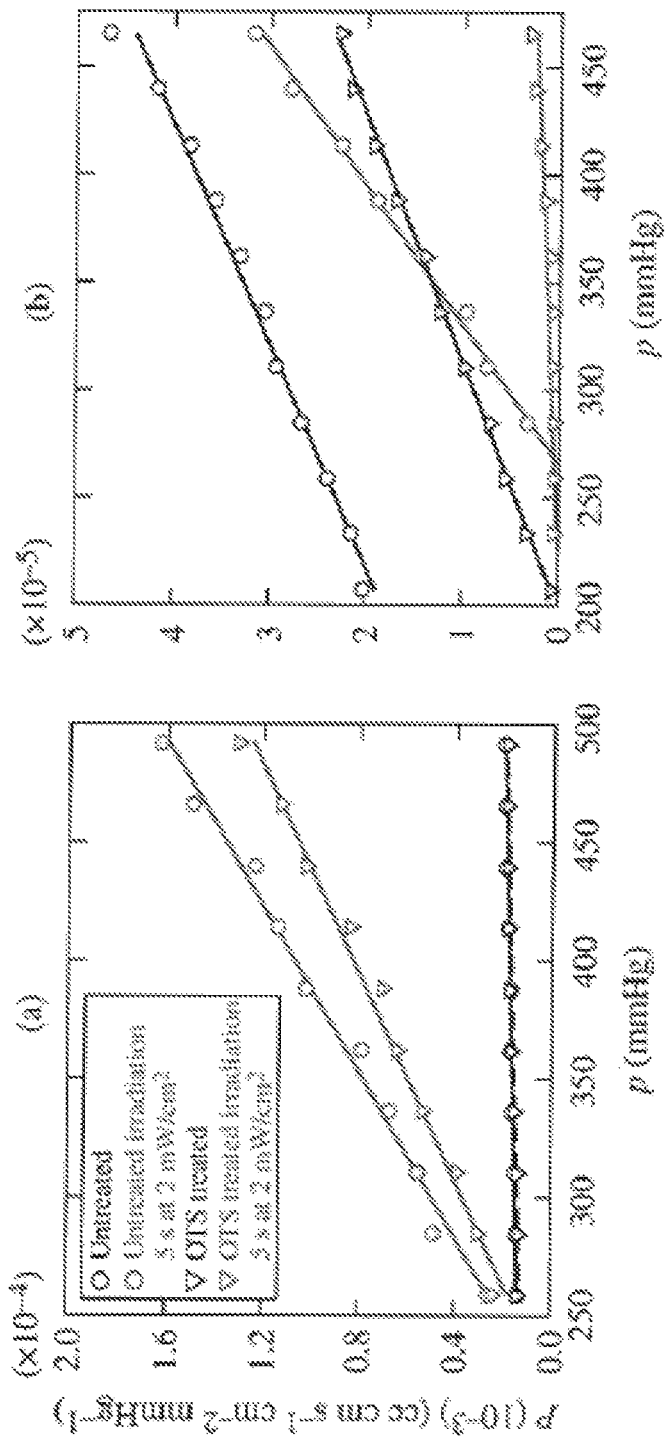
Figure 14:
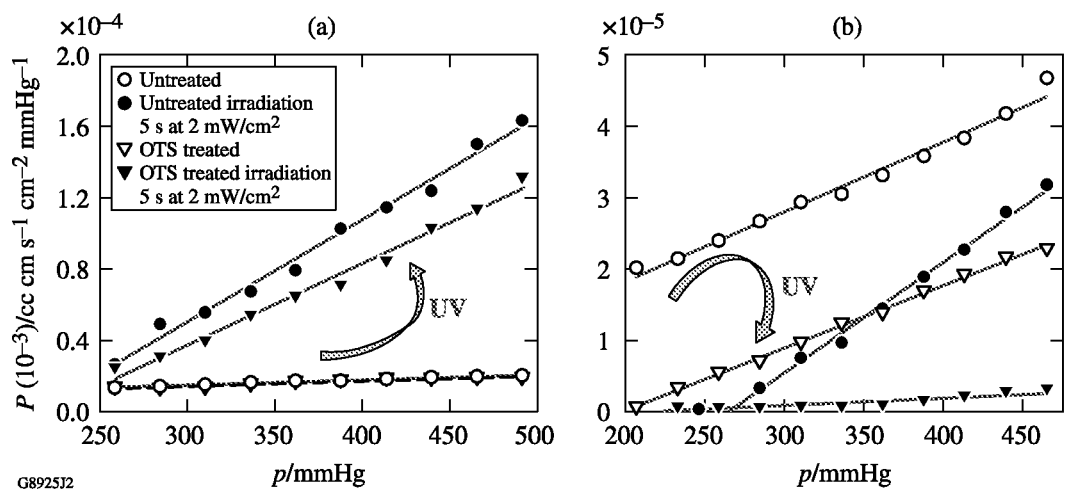
Figure 15A:
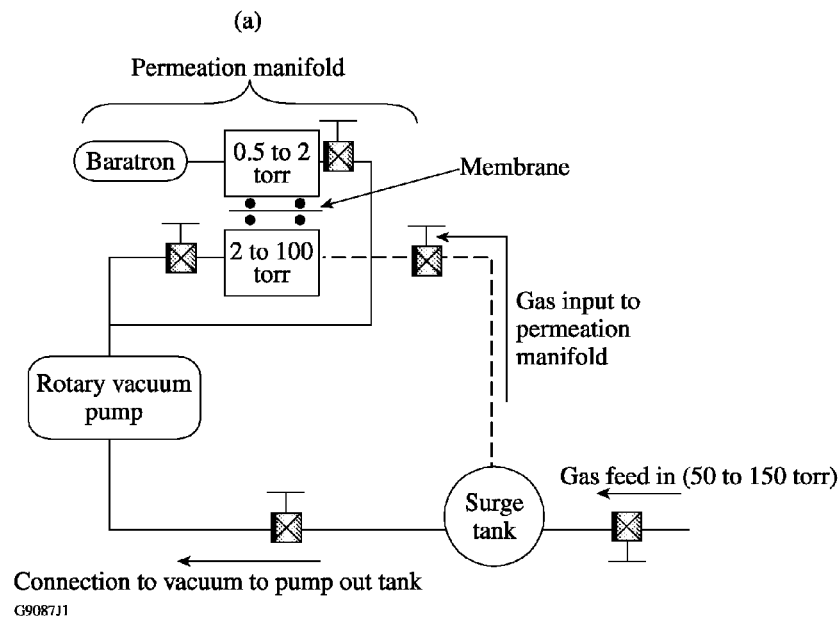
Figure 15A:
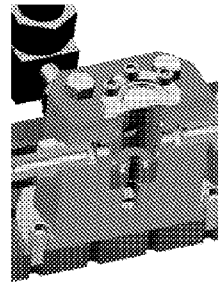
Figure 15B:
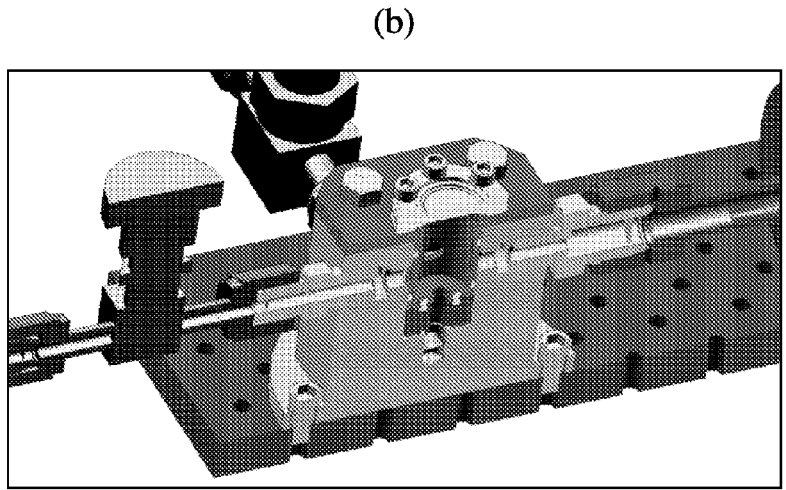
Figure 16A:
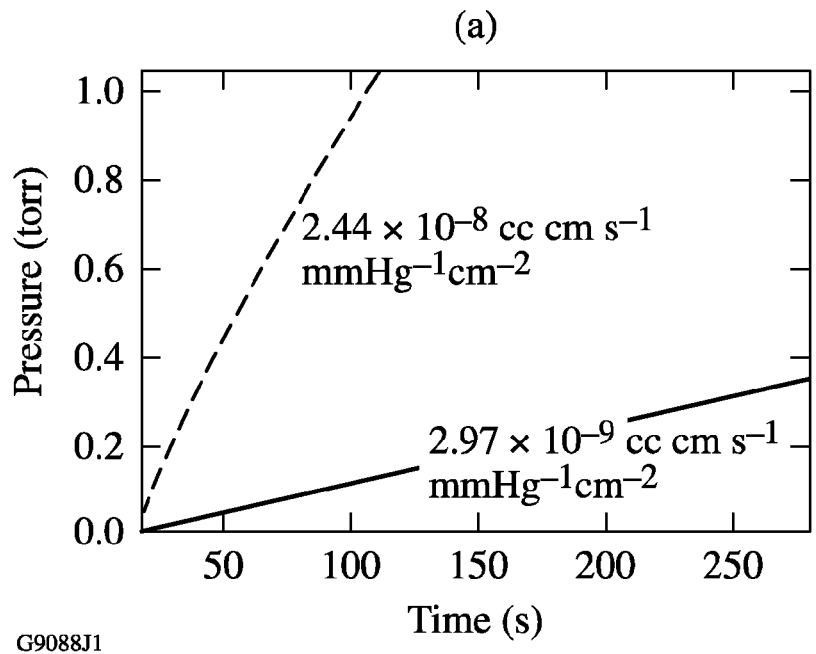
Figure 17:
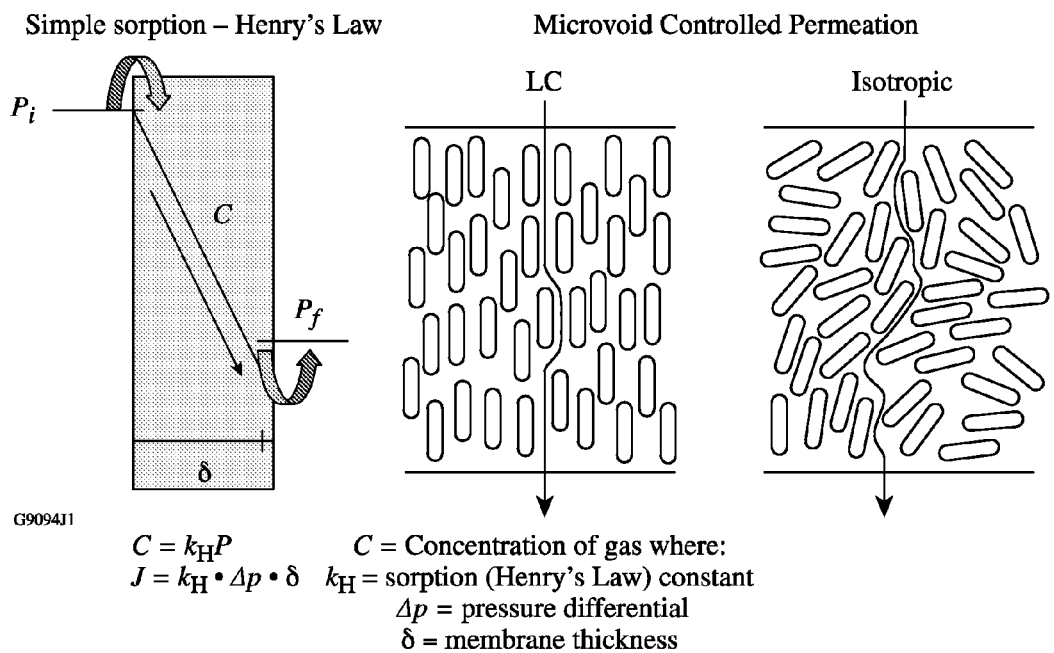
Figure 18:
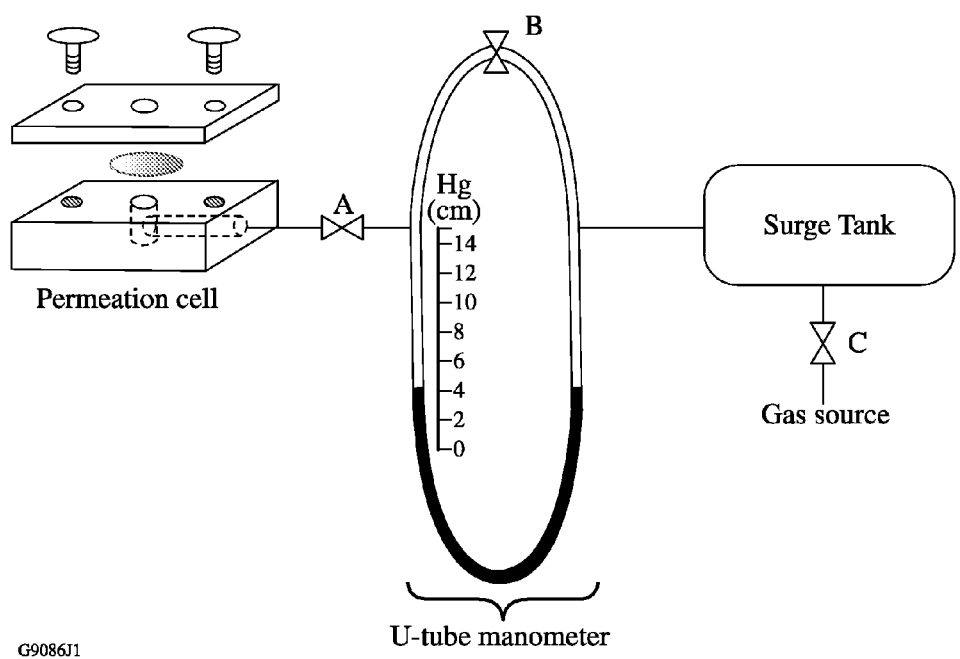
Figure 19:
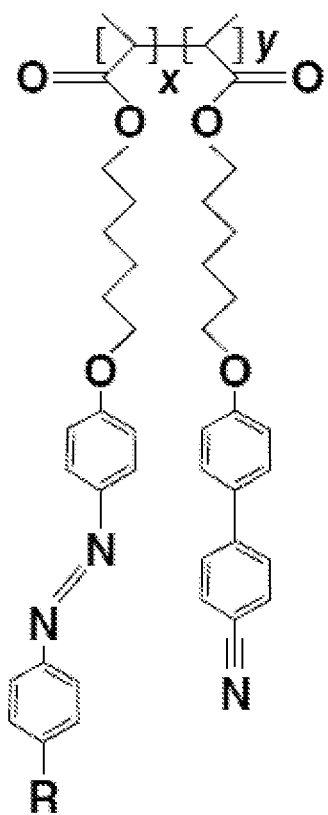

FIG. 7 is a series of photomicrographs of the two photo-switchable LC eutectics imbibed into 10 μm pores of Isopore polycarbonate membranes viewed at 1000× magnification in polarized incident light, where the optic axis of the birefringent polycarbonate membrane was fixed parallel to the incident polarizer and the analyzer was rotated to be oriented either parallel or perpendicular to the incident polarizer—the top three images are Eutectic 1, and the bottom three images are Eutectic 2;

FIG. 8 is a graph of permeability versus pressure (sorption isotherms) curves for the two photo-switchable LC mixtures;

FIG. 9 is an illustration of the photo-switchable operation of LC/mesogenic dye confined in track-etched membrane pores based on reversible isothermal nematic-isotropic phase changes;

FIG. 10 is a series of graphs of normalized absorption ($A_t/A_0$) over time for the two eutectic mixtures at 360 nm following 10 seconds of irradiation (2 mW/cm$^2$), with multiple measurements taken over 1 hour; (b) shows the behavior of OTS-aligned eutectic 1 in 400-nm pores;

FIG. 11 is a series of graphs of DSC heating scans for Eutectic 1 (a) and Eutectic 2 (b);

FIG. 12 is polarizing optical microscope ("POM") images of LC material confined in 10 μm pores: (a) Eutectic 1 without alignment; (b) Eutectic 2 without alignment; and (c) Eutectic 1 in pores treated with 2% OTS solution;

FIG. 13 is a series of graphs of the permeability/pressure relationships for imbibed LC materials in 400-nm pores: (a) Eutectic 1; and (b) Eutectic 2;

FIG. 14 is a series of graphs of permeability isotherms obtained using the variable-volume method for imbibed LC materials in 400-nm pores: (a) Eutectic 1; and (b) Eutectic 2;

FIG. 15A is a schematic of a variable-pressure, constant-volume apparatus used for measuring photo-responsive permeation membranes;

FIG. 15B is a cross-sectional schematic of the measurement cell of the apparatus in FIG. 15A;

FIG. 16A is a graph of permeation transients obtained using the variable-pressure method, where the initial pressure gradient was 190 Torr/10 mTorr, with eutectic 1 imbibed in 400-nm pores;

FIG. 16A is a graph of permeation transients obtained using the variable-pressure method, with transients for 94:6 w % cyanobiphenyl acrylate:azobenzene acrylate polymerized in 400-nm pores;

FIG. 17 is schematics of two models of gas diffusion through membrane materials;

FIG. 18 is schematic of a variable-pressure, constant-pressure permeation-measurement apparatus according to one embodiment of the invention; and FIG. 19 is a graphical representation of the composition of a cyanobiphenyl polyacrylate according to an aspect of the invention.

DETAILED DESCRIPTION OF THE INVENTION

Mesogenic materials offer a range of thermotropic secondary transitions that can potentially afford unique and tunable materials for permeation membranes. In the early 1980s researchers reported on a series of polymer-dispersed liquid crystalline ("PDLC") membranes and their permeation characteristics. Among the systems reported are included the well-known Schiff base 4-ethoxybenzylidene-4'-butylaniline ("EBBA") dispersed in either poly[vinyl chloride] ("PVC"), or polycarbonate ("PC") polymer hosts, as well as 4-cyano-4'-pentylbiphenyl ("SCB") dispersed in PVC. These polymer-dispersed systems demonstrated significant and rapid changes in permeation both at the crystalline-nematic and the nematic-isotropic transition temperatures, as well as high selectivity for the vapor-phase separation of hydrocarbon isomers caused by the efficient molecular packing of the LC mesophase. Finally, in an experiment featuring the transport of small inorganic cations by crown ethers dissolved in PDLC's, it was found that the LC domains interpenetrating through spongy polymer fibrils provide a low-viscosity diffusing phase for small molecules or larger molecules conducting a facilitated transport. Such a system has many of the advantages of a liquid-diffusing phase, such as high mobility of permeants, but with the mechanical properties of a polymeric material. An obvious caveat to such an approach is that using changes in temperature to vary the permeability of the membrane material is intrinsically coupled to the kinetics of the diffusing gas or other permeant. Using heating or cooling for permeability tuning can be not only energy intensive, but for many applications may also have an unacceptably long response time caused by unfavorable thermal transport characteristics of polymer materials. Although thermally induced LC phase changes have been investigated for controlling permeation in drug delivery applications, the primary aim in this work was to avoid the complications and caveats mentioned above by evaluating the permeation characteristics of LC materials under isothermal conditions.

EXAMPLE 1

In the first example, below, the optical, thermal, and orientational properties of the confined LC eutectics are characterized and their basic permeation qualities are evaluated. The reversible permeation control of nitrogen gas is also demonstrated.

Figure 1:
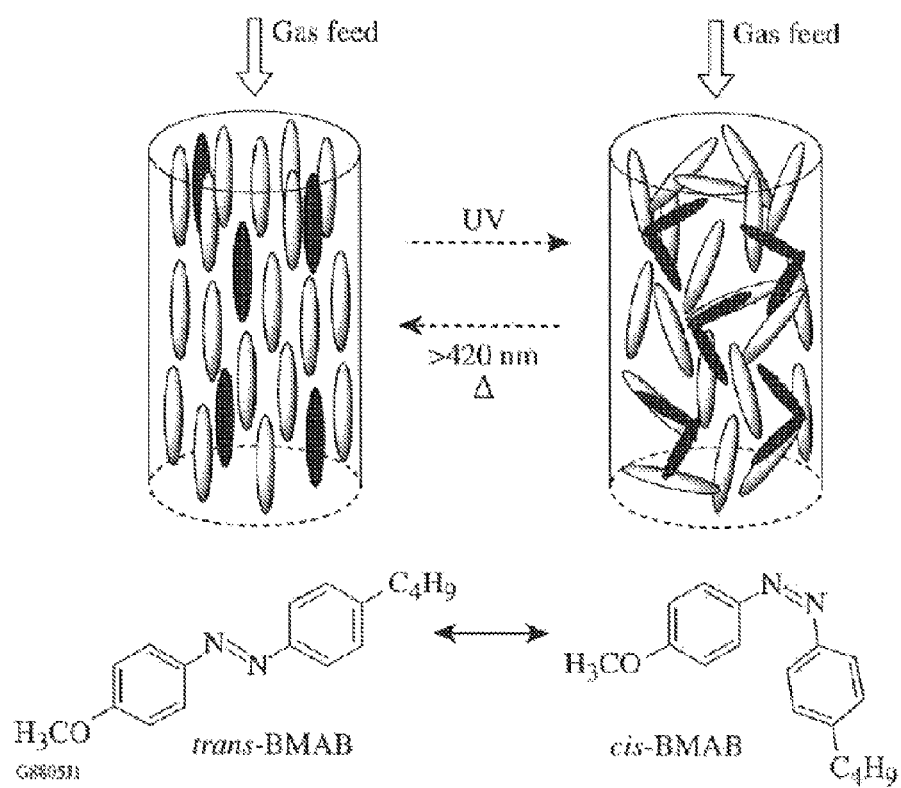
FIG. 1 is an illustration of a reversible, photo-switchable/tunable composite LC membrane based on isothermal phase changes.

To generate phase changes isothermally, the inventors used photochromic dyes that demonstrate a photomechanical effect. Azobenzene derivatives are photochromic dyes that convert incident light to mechanical energy through the process of trans-cis isomerization. Appropriate substitution at the para positions affords azobenzene derivatives, where the trans form is mesogenic because of its rod-like shape. In contrast, the cis isomer's bent shape substantially perturbs LC ordering. This effect is illustrated in FIG. 1.

Several demonstrations of bulk nematic- to isotropic-phase changes induced by trans-cis photoisomerization in azobenzenes have been conducted in both low-molar-mass and polymeric systems. This "photomechanical" effect has been exploited to generate numerous types of reversible changes when azobenzene materials are added as "guest" dopants to both fluid and polymer "hosts."

Figure 2:
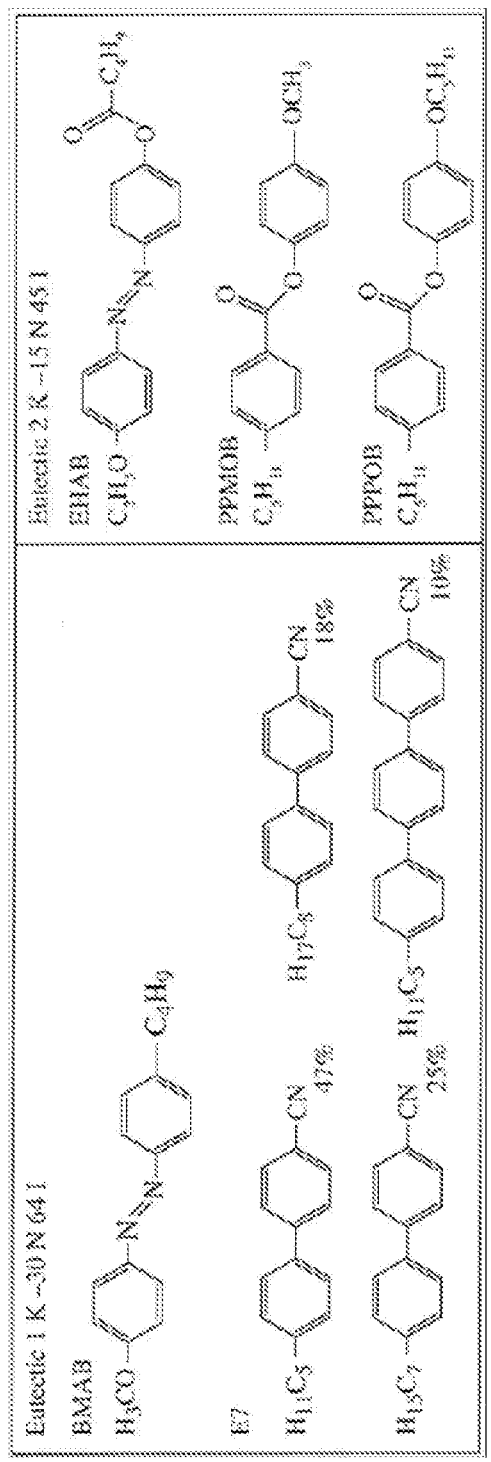
FIG. 2 is a graphical representation of the composition of the two photo-switchable LC eutectic mixtures used in preparing photo-switchable gas permeation membranes.

For efficient photo-switching in LC-based permeation membranes, the concentration of azobenzene absorbers in the LC host must be carefully selected to be large enough to effectively induce an isothermal phase change but not large enough to prevent penetration of the activating optical radiation throughout the bulk of the film. The particularly high molar extinction coefficient of azobenzenes makes it especially important to limit their content in the membranes to ensure that the entire depth of the film is actuated. Two azo-containing eutectic LC mixtures are shown in FIG. 2. The azobenzene dye 4-butyl-4'-methoxyazobenzene ("BMAB") has been utilized extensively as a photo-responsive mesogenic chromophore to generate refractive-index changes in thin polymer films, for optical data storage, and has been incorporated at 15 wt % in the commercial eutectic mixture Merck E7 for photo-switching between the nematic and isotropic phases.

To study the influence of chemical composition on permeation, a second eutectic mixture (Eutectic 2) based on the phenyl benzoate LC materials 4-pentyl-4'-methoxybenzoate ("PPMeOB") and 4-pentyl-4'-pentoxybenzoate ("PPPOB") was used along with 4-ethoxy-4'-hexanoylazobenze ("EHAB") as the azobenzene dopant. Because both Eutectic 1 and Eutectic 2 have similar nematic ranges, viscosities, and dye content, these systems represented a nearly ideal "matched set" for evaluating the relationship of chemical composition of the LC phase on gas permeability in the confined membrane environment.

It should be noted, however, that other LC compounds, materials, or mixtures known to those skilled in the art can be used in place of the cyanobiphenyl and phenyl benzoate examples described in greater detail herein. This includes, but is not limited to, compounds such as cyanobiphenyl acrylates and polyacrylates, phenylcyclohexanes, cyclocycohexanes, and pyrimidines, among many others.

Photo-switchable membranes were fabricated either by dispersing the azobenzene-doped LC eutectic mixture into a host polymer solution and casting as a PDLC membrane or by imbibing the LC material directly into the cylindrical "track-etched" micropores of a commercial polycarbonate (Isopore) membrane. Track-etched membranes are formed by bombardment with high-speed alpha particles, followed by chemically etching the damaged radiation tracks to produce cylindrical pores with remarkably smooth cavity surfaces. Previous studies of nematic LC materials confined in such a micropore environment have shown that the pore walls function as a homogenous alignment surface, resulting in the nematic director field configuration being uniaxial and parallel with respect to the pore wall. To test the effect of the LC alignment state (parallel or perpendicular to the pore walls) on permeation, the pore walls were treated with the reactive silane OTS (n-octyltriethoxysilane). FIG. 1 shows a schematic diagram of how a photo-switchable LC material imbibed into a porous polymer membrane could be used for gas phase switching and tuning applications. Utilizing the well-defined, cylindrically symmetrical, pre-formed porous structure of the membrane makes it possible to directly and conveniently probe the permeation properties of the photo-switchable LC host in the membrane as a function of LC orientation and irradiation. Porous membranes imbibed with LC proved to be much better candidates than PDLC materials. Below is characterized the optical, thermal, and orientational properties of the confined LC eutectics, and their permeation qualities are evaluated, along with the demonstration of the reversible permeation control of nitrogen gas.

Results

Photocontrollable PDLC Membranes

Initial attempts focused on creating PDLC's for functional gas permeation membranes. The major challenge in fabricating PDLC membranes for permeation applications is that the confined LC material will often heavily plasticize the polymer host, producing membranes without the necessary mechanical robustness. The PDLC's reported by Kajiyama overcame this difficulty by using a large thickness (several hundred microns), which precludes efficient photo-actuation through the depth of the film because of the high extinction coefficient of azobenzene in the LC mixture. Although the inventors were successful in fabricating poly(vinyl chloride) (PVC)-based freestanding PLDC membranes that were only a few microns thick, they proved to be insufficiently mechanically robust and were ruptured by pressures >1 psi. Attempts to improve the membrane strength by using poly(methyl methacrylate) ("PMMA") crosslinked with ethylene glycol dimethacrylate as the host polymer produced membranes that were extremely mechanically robust. The LC, however, still plasticized the host, resulting in membranes that stretched and "ballooned out" under pressure, but did not break because of the strength of the crosslinked PMMA. Based on these results, it became immediately apparent that, without a great deal of additional materials research activities, freestanding PDLC membranes would not be very practical candidates for photo-controlled membranes.

Photo-Controllable Track-Etched Membranes with Imbibed LC Material: Photo-Switching and Kinetics The relatively thin membrane cross section of the photo-switchable LC-imbibed Isopore polycarbonate membranes (10 μm) along with their high transparency in the long wavelength-range UV, makes reversible photo-switching possible by irradiation through alternating band pass filters (365 nm or 420 nm).

Figure 3:
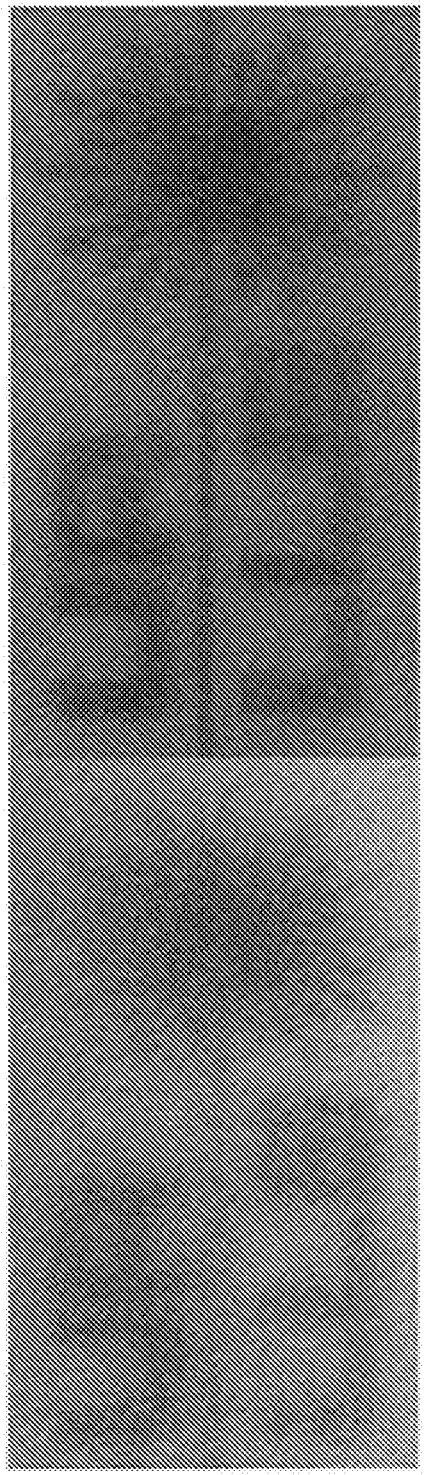
FIG. 3 is a photo of three stacked 10 μm-thick Isopore polycarbonate membranes (total optical path=30 μm) imbibed with Eutectic 1, placed directly on top of a black image printed on white paper and viewed in reflection, where the left image is before UV irradiation and the right image is after UV irradiation at 365 nm at 2 mW/cm$^2$ for 10 seconds.
Figure 4:
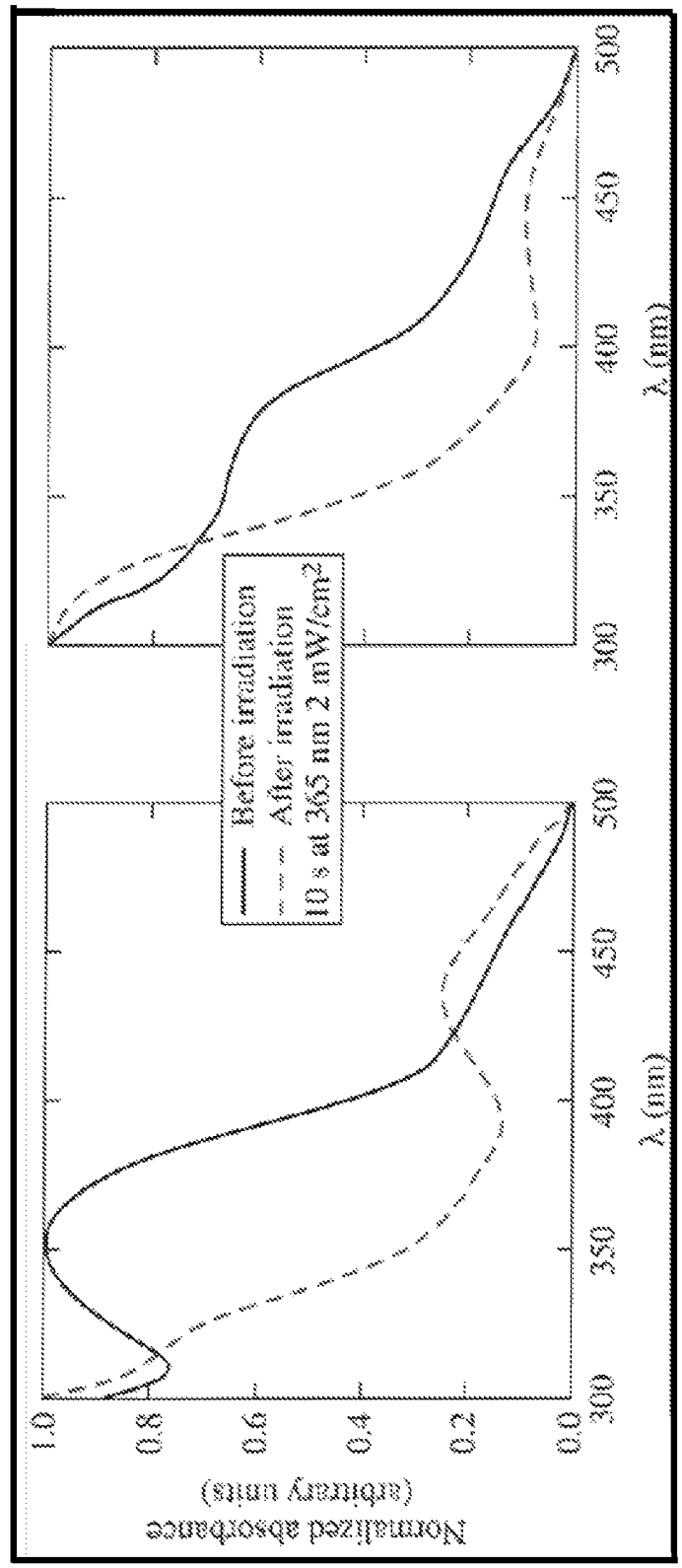
FIG. 4 is graphs of the UV-Vis spectra for membranes imbibed with Eutectic 1 (right) and Eutectic 2 (left) before and after UV irradiation.

To demonstrate that photo-isomerization was indeed solely responsible for the observed phase changes, UV-Vis spectra were obtained for Isopore films imbibed with Eutectic 1 and Eutectic 2 both before and after irradiation under the same conditions (FIG. 4). Ten seconds of irradiation time (which corresponds to a fluence of 2 mW/cm$^2$) is sufficient to nearly eliminate the absorbance band from the trans isomer at ~360 nm. The accompanying rise of absorption at 420 nm from the photo-generated cis isomer appears as a small peak because of the low molar extinction coefficient of the cis isomer relative to the trans isomer. The 360-nm peak that appears as a shoulder in the spectrum of the Eutectic 1-imbibed membranes is due to the absorbance of the cyanobiphenyl components of the E7 host LC. Irradiation with light >420 nm regenerates the trans form and affords the complete return to the original pre-irradiation spectrum for both eutectic mixtures. As is well known from PDLC research, the refractive-index mismatch between micrometer-sized nematic droplets of LC material and the polymer host results in a highly scattering film. This refractive-index mismatch can be reduced or eliminated by inducing the LC material to undergo a phase change to the isotropic state either thermally or photochemically. In the case of an LC host containing azobenzene dyes imbibed in a porous polycarbonate membrane, a similar phase change (induced instead by photochemical means) can be expected. FIG. 3 shows an image viewed through a stack of three photo-switchable LC-imbibed polycarbonate membranes containing Eutectic 1 (total path length=30 μm) before and after irradiation with 365-nm UV. Although the contrast ratio between irradiated and non-irradiated membranes was relatively low due to the small LC domain size (400-nm LC-containing pores) in these membranes, they nevertheless clearly demonstrate that an LC-to-isotropic phase change is indeed occurring under the selected irradiation conditions. The isothermal nematic-isotropic phase changes were also verified by polarized optical microscopy (POM).

Figure 5:
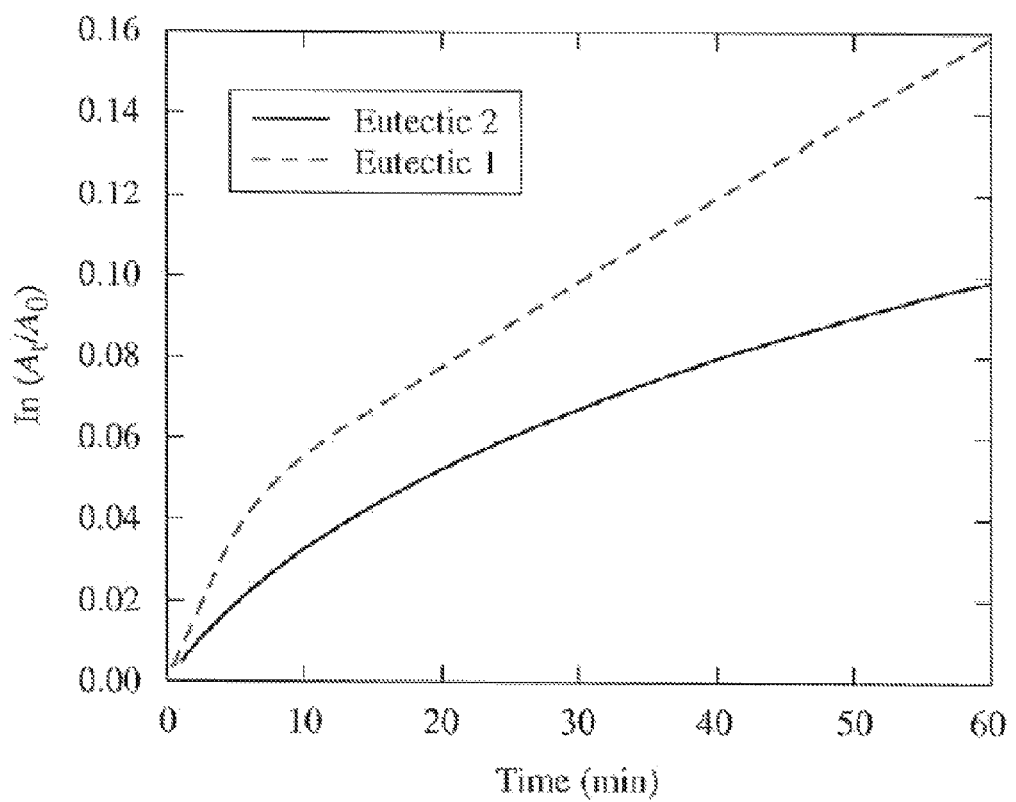
FIG. 5 is a graph of the natural logarithm of the absorbance over time at 460 nm for two different photo-switchable LC material compositions, each confined in 400-nm pores of an Isopore polycarbonate membrane.
Figure 6:
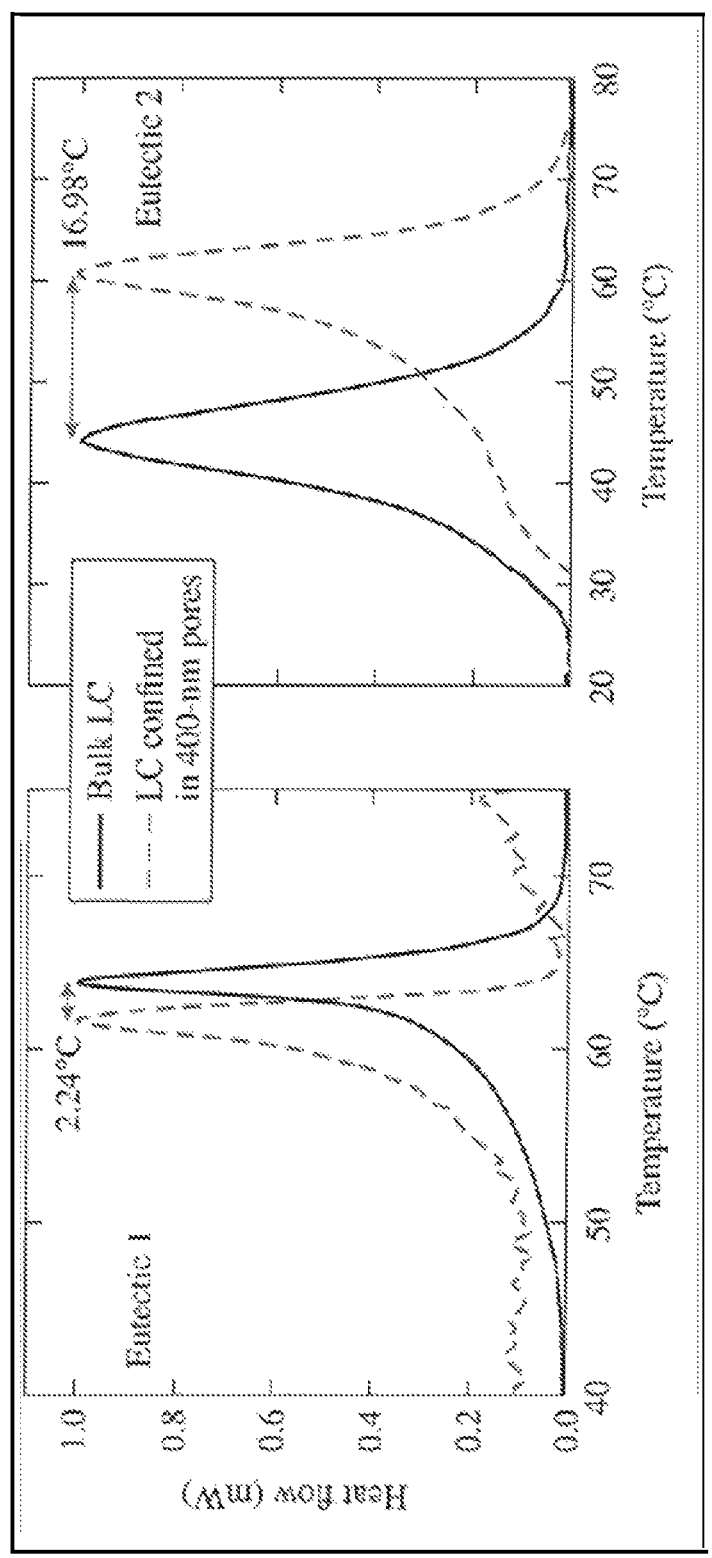
FIG. 6 is a graph of the comparison of differential scanning calorimeter ("DSC") thermograms of the two photo-switchable eutectic mixtures in the unconfined (bulk) state versus confinement in the 400-nm pores of an Isopore polycarbonate membrane.

The kinetics of thermal relaxation of the azobenzene dyes from the photo-generated cis state back to the original trans state in the confined environment are a parameter of interest. After irradiating a membrane for 10 s at 2 mW/cm$^2$, the change in absorbance ($A_t/A_0$) at 365 nm was monitored as a function of time. The recovery of the trans isomer $\pi$-$\pi$* absorption band with time obeyed first-order kinetics for azobenzene dyes dissolved in solution. Azobenzene chromophores in the solid state, such as in thin films, are known to follow a more-complex behavior. This behavior is due to the fact that steric effects of the host environment on the azo dye affect the thermodynamics of thermal cis-trans isomerization. FIG. 5 shows a logarithmic plot of $A_t/A_0$ as a function of time. The steep initial rise in the curve followed by a more-gradual leveling off and linear behavior is attributed to a first-order process with two rate constants, with the greater rate constant corresponding to azobenzene cis isomers that are in a more-strained environment. Because of the alignment effect of the confining surface, it was hypothesized that azobenzene mesogens close to the pore wall isomerize faster than those in the bulk. It was found that the thermal relaxation of confined azobenzene mesogens resembled that of azobenzenes in the solid state and could be modeled using the biexponential expression:

$$[trans]_t/[trans]_0 = \alpha \exp[-k_1 t] + (1-\alpha)\exp[-k_2 t]$$

The calculated rate constants are an order of magnitude greater than typical azobenzenes in solution in an isotropic solvent. The OTS-aligned Eutectic 1 proved to be anomalous to the other confined materials in that photo-induced isomerization occurred more slowly, and only after 10 min in the dark did the cis-isomer population begin to decline.

Dispersion State of Imbibed LC Materials

Understanding the ordering of mesogenic molecules in the porous membrane structure is requisite to interpreting the permeation characteristics of such materials. The nematic range of the eutectic materials was evaluated both in the bulk state and imbibed into the pores using both POM and differential scanning calorimetry (DSC). For DSC evaluation, the membranes were carefully chopped into pieces and then packed into a DSC pan for measurement. Although the quantity of mesogenic material in the pores was very small, definite phase-transition endotherms were visible with good signal-to-noise ratio at scan rates of 40° C./min on both heating and cooling. Repeated cycling produced no noticeable changes in the DSC thermograms for all samples evaluated. Thermograms for the eutectic materials in both the free-bulk and confined geometries were normalized to balance out the large disparity in sample quantity. FIG. 10 compares the nematic-isotropic phase-transition temperatures for the two photo-switchable eutectic mixtures in the unconfined bulk versus the confined environment of the membrane pores, with and without treatment with OTS. For Eutectic 1 (biphenyl host), the nematic-isotropic transition temperature $T_{cl}$ decreased only slightly in the confined state, while in Eutectic 2 (phenyl benzoate host) $T_{cl}$ increased relative to the bulk material, which indicates the confined environment increases the LC bulk order and stabilizes the LC phase.

For the biphenyl host (Eutectic 1), the observed reduction in $T_{cl}$ may be caused by extraction of trace unreacted monomers from the porous polycarbonate membrane, since biphenyl materials such as E7 are well known to plasticize many different polymer systems. Studies of E7 and other cyanobiphenyl LC materials in PDLC's have also shown very small drops in $T_{cl}$ of dispersed nematic droplets. OTS treatment increased the $T_{cl}$ for both confirmed eutectics, suggesting the effectiveness of this treatment in supporting LC alignment.

Direct observation by POM of the texture of the LC photo-switchable host confined in the 400-nm pores of the Isopore membrane was not possible because of (1) the regions of highly crystalline polycarbonate domains of the order of several microns that extensively scatter light in the membrane and (2) the high birefringence of the membrane imparted by the extrusion process used in its fabrication. For Isopore membranes with 10 μm pores, the inventors were able to image the LC orientation in the pores by keeping the optical axis of the film fixed so that it was always aligned parallel to the incident polarizer. Rotating the analyzer so that it was oriented either parallel or perpendicular to the incident polarizer allowed one to see the confined LC at 1000× total magnification using combinations of transmitted and reflective illumination. Prior to imaging the membrane, any remaining traces of free LC material were removed from the surface by spinning the membranes at 3000 rpm and washing with several drops of hexane. FIG. 7 shows a series of photomicrographs of the two photo-switchable LC eutectics imbibed into 10 μm pores of Isopore membranes. When viewed under crossed polarizers in reflection and transmission, the pores appeared as brighter areas while the surrounding polymer matrix appeared dark. The smeared birefringent areas around some of the pores are most likely caused by leaching of the LC eutectic into defect voids that extend laterally out from any pore walls that have been over-etched during membrane manufacture. Viewing under crossed polarizers with both transmitted and reflected illumination while rotating the sample stage establishes that the LC molecules are uniaxially arranged in the 10-μm pores and parallel to the pore axis. These findings are consistent with deuterium NMR studies for nematogens in Isopore membrane pores, as well as for inorganic porous photonic crystals (200- to 600-lIIn pores) imbibed with LC material. Membranes treated with OTS demonstrated the Maltese-cross optical texture that is characteristic of radial alignment.

Permeation Properties

Permeation tests are carried out using traditional volume/time method to determine the steady-state permeation coefficient P. The coefficient P is defined as the Fickian flux (J) times the value of membrane thickness (l) divided by the pressure difference (Δp) across the membrane, where the flux J equals the concentration gradient (concentration ϕ divided by length x) multiplied by a diffusion coefficient D:

$$J = -D(d\phi/dx) \quad P = J \cdot l/\Delta p$$

After the membranes are allowed to equilibrate at a given pressure, the volume of nitrogen diffused over time is measured. The membrane is then irradiated with 365-nm light for 5 s (2 mW/cm$^2$) to switch it into the isotropic state and then allowed to reach equilibrium, after which the permeability is re-measured. Irradiation is then conducted using >420 nm for the same time and intensity as the UV irradiation to photo-switch the membrane back to the LC state. This test cycle is repeated to check for reversibility, which is defined as four cycles between the alternately photo-generated states without measurable deviations from steady-state permeation behavior of the respective states. From initial tests, a clear relationship emerged between confining pore size and the capacity to withstand incident pressure. Membranes with larger pores do not display sufficient stability with respect to sustained irradiation-permeation cycles. Neither 5 μm nor 10 μm pore sizes provided sufficient confinement strength to retain the LC eutectics in the pores. It was shown that 400-nm pores perform very well over consecutive test cycles. Imbibed 400-nm pore membranes were 6 to 7 orders of magnitude less permeable than empty membranes. When filled with LC eutectics, they exhibited permeability of the same range as well-known, highly permeable rubbery polymeric materials, such as poly (dimethylsiloxane). Both LC materials display good reversibility below 500 mmHg. FIG. 8 shows permeability versus pressure (P vs p) data for Isopore membranes with 400-nm pores imbibed with both Eutectic 1 and Eutectic 2. Both materials appear to follow ideal linear P vs p behavior in both the LC and the isotropic states.

The isotropic state provides greatly increased permeation in photo-switched imbibed Eutectic 1. Treatment with OTS serves to slightly lower the permeability of the photo-generated isotropic state, although that of the LC state is unchanged. It was concluded that uniaxial versus radial alignment has no effect on the permeability of Eutectic 1. In the case of Eutectic 2, the photo-generated isotropic state is less permeable than the initial LC state, and overall permeability values are an order of magnitude lower than Eutectic 1. The effect of the OTS alignment is significantly more pronounced. The increased $T_{cl}$ shown by DSC and the faster cis-trans thermal isomerization suggest that enhanced LC ordering is responsible for lower permeation. Eutectic 1 shows permeation overall an order of magnitude greater than Eutectic 2, for both LC and isotropic states, with or without OTS treatment. This finding leads us to conclude that the intrinsic sorption-diffusion-desorption properties (with respect to nitrogen) of the imbibed material are what change upon photo-irradiation. Increasing the permeation difference between photo-generated states and achieving potential tunable selectivity are the subjects of ongoing investigations.

Conclusions

The results of this effort have shown that photo-switchable LC materials based on azobenzene derivatives as the active element have potential for application to reversible photocontrollable gas permeation membranes. The imbibed mesogenic materials offer several tunable variables based on exploiting LC composition and alignment effects. For all imbibed materials, linear sorption-diffusion behavior was observed. Isothermally-generated permeability switching response times between the LC and isotropic state of 5 s were demonstrated at an intensity of 2 mW/cm² using alternating UV and >420-nm radiation. It is one aim to increase the overall differences in permeability that can be achieved through photo-switching of the confined LC host as well as explore possibilities for tunable selective permeation. These goals lead us to focus on exploiting the multitude of LC phases that are regularly used for various electro-optical applications (smectic phases, chiral phases, etc.). These materials potentially offer many types of tunable-ordered media that can be applied to separation technology and switchable interconnects in "smart" photocontrollable membranes.

EXAMPLE 2

In this work are described further studies to answer basic questions about how gases permeate through LC media by means of variable pressure, constant volume permeation analysis of imbibed LC materials containing azobenzene dyes, either dissolved as components of a host mixture or chemically functionalized as pendant groups to a polymerizable LC material.

Stimuli-responsive gas permeation membranes hold substantial potential for industrial processes as well as in analytical and screening applications. Such "smart" membrane systems, although prevalent in liquid mass-transfer manipulations, have yet to be realized for gas applications. Progress toward developing gas permeation membranes in which liquid crystalline (LC) phases afford the active region of permeation is reported below. To achieve rapid and reversible switching between LC and isotropic permeation states, the photomechanical action of mesogenic azobenzene dyes that can produce isothermal nematic-isotropic transitions was harnessed. Both polymeric and low-molecular-weight LC materials were tested. Three different dye-doped LC mixtures with mesogenic azo dyes were infused into commercially available track-etched porous membranes with regular cylindrical pores (0.4 to 10.0 μm). Photo-induced isothermal phase changes in the imbibed material produced large and fully reversible changes in the permeability of the membrane to nitrogen with 5 s of irradiation at 2 mW/cm². Using two measurement tools constructed in-house, the permeability of the photo-switched membranes was determined by both variable-pressure and variable-volume methods. Both the LC and photo-generated isotropic states demonstrate a linear permeability/pressure (ideal sorption) relationship, with up to a 16-fold difference in their permeability coefficients. Liquid crystal compositions can be chosen such that the LC phase is more permeable than the isotropic—or vice versa. This approach is the first system offering reversible tunable gas permeation membranes.

Tunable gas permeation membranes are an important applications area. It is demonstrated preliminary results showing the efficacy of using azobenzene derivatives to create reversibly photo-controllable permeation membranes. The permeation characteristics of track-etched polycarbonate membranes imbibed with mesogenic material have shown dependency on the composition of the LC mixtures used. Ideal sorption behavior has been demonstrated for imbibed LC materials, with changes of permeation coefficient in the photo-generated isotropic state. The diffusion coefficient is also high, as demonstrated by the lack of a detectable time lag. The "tortuosity" argument proposed for permeation in LC phases is not supported by the data for small-molecule gases. Immediate future research efforts are aimed at creating freestanding polymeric LC membranes as well as polymer-dispersed LC membranes, which could potentially offer tunable selectivity for different gases. Further efforts are aimed at characterizing the permeation of hydrocarbons through LC media. The multitude of LC phases that are regularly used for various electro-optical applications (smectic phases, chiral phases, etc.) offer many types of tunable-ordered media that could be applied to stimuli-responsive membranes and separation technology.

Results

The optical and thermal properties of LC-imbibed track-etched membranes were reported in Ref. 4. Permeation tests are carried out using a traditional volume/time method to determine the steady-state permeation coefficient P. The coefficient P is defined in Eq. (2) and related to sorption and diffusion in Eq. (3). As the first method of measurement, the variable-volume constant-pressure technique was chosen. This method is suitable to run repeated photo-switching cycles. After the membranes are allowed to equilibrate at a given pressure, the volume of nitrogen diffused over time is measured. The membrane is then irradiated with 365-nm light for 5 s (2 mW/cm²) to switch it into the isotropic state and then allowed to reach equilibrium, after which the permeability is re-measured. Irradiation is then conducted using >420 nm for the same time and intensity as the UV irradiation to photo-switch the membrane back to the LC state. This test cycle is repeated to check for reversibility, which is defined as four cycles between the alternately photo-generated states without measurable deviations from steady-state permeation behavior of the respective states. From initial tests, a clear relationship emerged between confining pore size and the capacity to withstand incident pressure. Membranes with larger pores do not display sufficient stability with respect to sustained irradiation-permeation cycles. Neither 5-μm nor 10-μm pore sizes provided sufficient confinement strength to retain the LC eutectics in the pores. It was found that 400-nm pores perform very well over consecutive test cycles. Imbibed 400-nm pore membranes were 6 to 7 orders of magnitude less permeable than empty membranes. When filled with LC eutectics, they exhibited permeability of the same range as highly permeable rubbery polymeric materials, such as poly (dimethylsiloxane). Both LC eutectic mixtures display good reversibility below 500 mmHg. FIG. 14 shows permeability versus pressure (P vs p) data for Isopore membranes with 400-nm untreated and OTS-treated pores imbibed with both Eutectic 1 and Eutectic 2. Both materials appear to follow ideal linear P vs p behavior in both the LC and the isotropic states.

The isotropic state provides greatly increased permeation in photo-switched imbibed Eutectic 1. Treatment of the membrane walls with octyltriethoxysilane (OTS) serves to slightly lower the permeability of the photo-generated isotropic state; the permeability of the LC state is unchanged. FIG. 9 shows the molecular orientation within the membrane pores for untreated and OTS-treated membranes. It was concluded that uniaxial versus radial alignment has no effect on the permeability of Eutectic 1. In the case of Eutectic 2, the photo-generated isotropic state is less permeable than the initial LC state, and overall permeability values are an order of magnitude lower than Eutectic 1. The effect of the OTS alignment is significantly more pronounced. The increased $T_{cl}$ shown by DSC and the faster cis-trans thermal isomerization suggest that enhanced LC ordering is responsible for lower permeation. Eutectic 1 shows permeation an order of magnitude greater than Eutectic 2, for both LC and isotropic states, with or without OTS treatment.

Figure 16B:
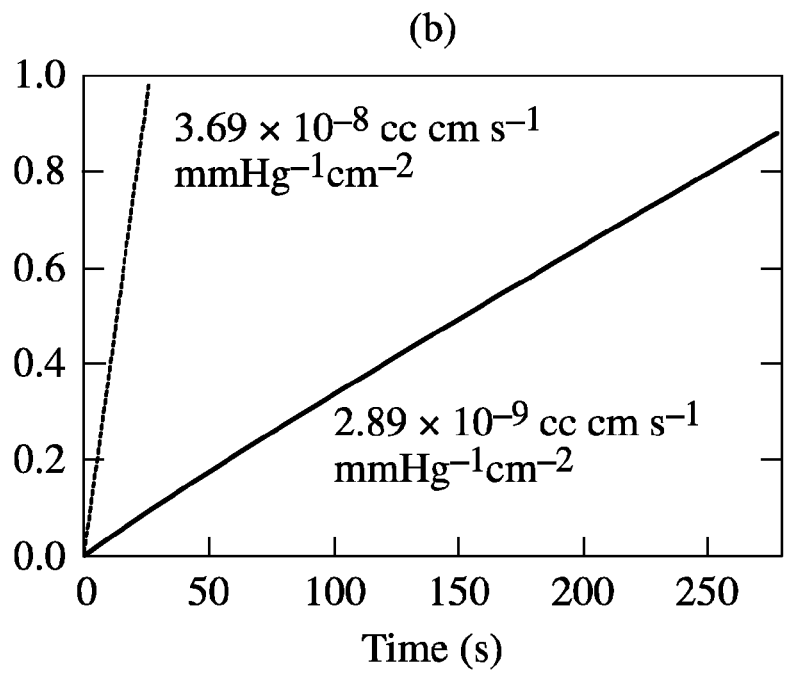

To better understand the sorption and diffusion components of permeation, the variable-pressure constant-volume apparatus shown in FIG. 15 was used. Permeation transients for both Eutectic 1 and the cyanobiphenyl polyacrylate in 400-nm pores are shown in FIG. 16. These two systems represent an analogous set. It was found that both cyanobiphenyl-based materials imbibed in 400-nm pores demonstrate very similar permeation characteristics. For the LC phase there is no detectable time lag (θ); steady-state permeation is reached very rapidly. This observation indicates a very high diffusion coefficient. The photo-generated isotropic state, likewise, has a high diffusion coefficient; the only difference is a higher permeation coefficient.

Two modes are possible for permeation through a membrane material (FIG. 17); (1) sorption-diffusion-desorption, which is followed by liquid and rubbery polymer systems; and (2) microvoid controlled permeation, which is generally followed by glassy polymers. Nonlinearities originating from complex permeant-concentration dependence are frequently observed, as are systems that follow one of the two models under different conditions. Following earlier work, a physical sieving model (microvoid control) was proposed for gas permeation through LC materials based on an experiment in which the LC 4-cyano-4'-pentylbiphenyl (5CB) was dispersed in PVC, and high electric fields were applied to orient the LC. It was found that as the electric field increased, the separation coefficient between linear butane and branched iso-butane hydrocarbons increased, and they postulated that permeation was controlled by "tortuosity," implying that a linear isomer of butane would more easily diffuse through a unidirectionally oriented nematic LC rather than would a branched isomer. For small molecules like nitrogen, this model is unlikely to hold, for three reasons: (1) both uniaxial and radial orientations of confined LC material have little effect on permeability; (2) although a "sieving" mechanism would be accompanied by the permeability being concave to the pressure-axis caused by microvoid control of permeation, for nitrogen the LC materials act like a liquid, following Henry's law (linear P vs p); and (3) both Eutectics 1 and 2 have matched thermal properties and can be photo-controlled across the LC-isotropic transition, yet have an opposite relation of phase to permeability. These findings lead us to conclude that the intrinsic sorption-diffusion-desorption properties (with respect to nitrogen) of the imbibed material are what change upon photo-irradiation: there is no physical sieving mechanism present in LC ordering that disappears in the isotropic phase.

Experiments evaluating the permeability of larger gases and, particularly, gaseous hydrocarbons, are needed to understand fundamentally how LC compounds behave as a membrane material for gases. This knowledge is integral to evaluating the utility that LC's can have in potential membrane applications.

EXAMPLES 1 AND 2 METHODS AND MATERIALS

1. Preparation of Photo-Switchable LC Mixtures

Photo-switchable eutectic mixtures were prepared by adding an azobenzene LC material to an existing eutectic LC mixture and mixing above the isotropic temperature of the mixture. The phase transition of the mixtures was verified by hot-stage polarizing microscopy (POM). Eutectic 1 was prepared by doping 14% w/w of the azobenzene 4-butyl-4'-methoxyazobenzene (BMAB) into the biphenyl host Merck E7 at elevated temperature (where the Merck E7 is a mixture comprising approximately 51 wt % of 4-cyano-4'-n-pentyl-biphenyl ("5CB"); approximately 25 wt % of 4-cyano-4'-n-heptyl biphenyl ("7CB"); approximately 16 wt % of 4-cyano-4'-n-oxyoctylbiphenyl ("8OCB"); and approximately 8 wt % of 4-cyano-4''-n-pentyl-p-terphenyl ("5CT")). It should be noted that while Merck E7 was used for certain experiments herein, other biphenyl hosts are possible. The azobenzene compound was synthesized, as previously reported. Eutectic 2 was prepared by doping 15% w/w of 4-ethoxy-4'-hexanoy-lazobenzene (EHAB) obtained from Eastman Chemical into a 60:40 w/w eutectic mixture of 4-pentylphenyl-4'-methoxybenzoate (PPMeOB) and 4-pentylphenyl-4'-pentoxybenzoate (PPPOB) at an elevated temperature. These two phenylbenzoate materials had been previously synthesized and purified by the inventors using well-known preparation and purification techniques.

2. Preparation of LC-Imbibed Track-Etched Membranes

Track-etched, 10 μm-thick Isopore polycarbonate films with pore sizes of 0.4 μm, 5 μm, and 10 μm were heated to 100° C. in vacuum (200 mTorr) overnight to remove water and other volatile components. The membranes were imbibed with LC through capillary action by completely immersing them into the LC eutectic at a temperature above its isotropic transition (80° C.) for 1 h. Excess LC on the surfaces of the membrane was removed by carefully rubbing the membranes between two sheets of filter paper. To achieve homeotropic alignment, the reactive silane OTS was used. Membranes were immersed in a solution of 2 wt % OTS in ethanol with a few drops of acetic acid catalyst for 5 min, then dried in a vacuum oven. For POM imaging, all residual LC material was removed from the surface by spinning the membranes at 3000 rpm and washing with a few drops of hexane. Photo-switching experiments were conducted using a Rolence Technologies Q-Lux handheld UV curing unit (365 nm at 70 mW/cm$^2$). The output wavelength bandwidth was narrowed to 365 nm and 420 nm, as required, using optical band pass filters (Edmund Optics).

3. Physical and Optical Properties Characterization

Differential scanning calorimetry (DSC) measurements were conducted using a Perkin-Elmer DSC 7 with a CCA-7 liquid nitrogen sub-ambient accessory. The sample and reference compartments were purged with nitrogen at a flow rate of 20 ml/min. Optical spectroscopy (UV-VIS) was accomplished using a Perkin-Elmer Lambda 900 spectrophotometer, while visualization of the LC confined in the porous membrane structure was carried out using either a Leitz Orthoplan POL polarizing microscope or a Leica DMRX polarizing microscope at up to 1000× total magnification with reflected and transmitted illumination.

4. Permeability Measurements

The permeability of the photo-switchable LC membranes to nitrogen was measured according to the variable volume-constant pressure method using an apparatus that was constructed in-house (FIG. 18). The membrane being tested was clamped between two rubber gaskets in an aluminum manifold and equilibrated with a given upstream pressure (200 to 500 mmHg). The permeation cell was designed in such a way that the membrane was irradiated directly. The permeation area was 0.5 cm$^2$.

5. Preparation of 4-Butyl-4'-methoxyazobenzene ("BMAB")

All chemicals were obtained from Sigma-Aldrich Chemical Co. unless otherwise noted. One eq. of 4-butyl-4'-hydroxyazobenzene (obtained from Beam Corp.) and 1.1 eq. potassium carbonate were dissolved in acetone and degassed with argon. Iodomethane (2.5 eq) in acetone was degassed and added drop-wise to the stirred mixture. The mixture was heated to 45° C. and stirred overnight. The progress of the reaction was monitored by thin-layer chromatography (TLC); 12 h was usually sufficient for complete methylation. The hot reaction mixture was then filtered to remove the precipitated potassium iodide. The filtrate was collected and the solvent removed in vacuo. The solid residue was re-dissolved in chloroform and then insoluble salts were removed by filtration. The filtrate was washed with water, and the organic layer was separated and dried over magnesium sulfate. Removing the solvent in vacuo afforded a solid that contained the desired product ("BMAB") containing a small amount of un-reacted starting material 4-butyl-4'-hydroxyazobenzene. Recrystallization from methanol at −68° C. afforded pure crystals of BMAB that were collected by filtration. (K 35 N 45 I) $^1$H NMR 200 MHz δ ppm=0.94 (t, 3H), 1.18 (q, 2H), 1.66 (q, 2H), 2.66 (t, 2H), 3.86 (s, 2H), 7.0 (d, 2H), 7.26 (d, 2H), 7.82 (d, 2H), 7.88 (d, 2H).

6. Photo-Switchable LC Eutectic Mixtures

Photo-switchable eutectic mixtures were prepared by addition of an azobenzene LC material to an existing eutectic LC mixture and mixing above the isotropic temperature of the mixture. The phase transition of the mixtures was verified by hot-state polarizing microscopy (POM). Eutectic 1 was prepared by doping 14% w/w of the azobenzene BMAB into the biphenyl host Merck E7 at elevated temperature. Eutectic 2 was prepared by doping 15% w/w of EHAB (Eastman Chemical) into an existing 60:40 eutectic mixture of 4-pentylphenyl-4'-methoxybenzoate (or PPMeOB) and 4-pentylphenyl-4'-pentoxybenzoate (or PPPOB) at elevated temperature, previously synthesized and purified in-house using well-known preparation and purification techniques.

7. Membrane Preparation: PDLC membranes

Photo-switchable PDLC membranes were formed by two different processes. Membranes based on a PVC polymer host were prepared by casting 1%-weight solutions of PVC/LC (40:60 w/w) from THF onto clean glass substrates. Formation of the phase-separated regions was visualized by POM. After annealing under vacuum at 40° C., the membranes were delaminated from the substrates in water, isolated, and dried at 40'C. under reduced pressure.

Crosslinked PDLC membranes based on acrylate polymer hosts were prepared by dispersing the LC eutectic in a 40:60 monomer/LC ratio, into a host mixture containing 98% methyl methacrylate and 2% ethylene glycol dimethacrylate along with a polymerization initiator azobisisobutyronitrile (AIBN) 0.5 w %. The reaction mixture was introduced via capillary action between two glass substrates separated by 25-μm spacers and cured at 60° C. for 3 h.

8. Membrane Preparation: LC-Imbibed Micropore Membranes

LC-imbibed, track-etched membranes were prepared using 10-flIn-thick track-etched Isopore polycarbonate films (Millipore Corp). These membranes were formed by bombardment with high-speed alpha particles, followed by chemically etching the damaged radiation tracks to produce cylindrical pores with remarkably smooth cavity surfaces. Isopore membranes with pore sizes of 0.4 μm, 5 μm, and 10 μm were heated to 100° C. in high vacuum (<1 mTorr) overnight to remove water and other volatile components. The membranes were imbibed with LC through capillary action by completely immersing them into the LC eutectic at a temperature above the LC isotropic transition (80° C.) for 1 h. Excess LC on the surfaces of the membrane was removed by carefully rubbing the membranes between two sheets of filter paper. For POM imaging, all residual LC material was removed from the surface by spinning the membranes at 3000 rpm and washing with a few drops of hexane.

9. Membrane Preparation: Membrane Properties Testing

Photo-switching experiments were conducted using a Q-Lux handheld UV curing unit (365 nm@70 mW/cm$^2$) purchased from Rolence Technologies. This unit is commonly used to photocure dental sealants and other small-area applications, and was specifically chosen to provide a convenient, low output UV source. The output wavelength bandwidth of the Q-Lux source was narrowed to 365 nm and 420 nm, as required, using optical band pass filters (Edmund Optics).

Differential scanning calorimetry (OSC) measurements were conducted using a Perkin-Elmer DSC 7 with a CCA-7 liquid nitrogen subambient accessory. The sample and reference compartments were purged with nitrogen at a flow rate of 20 ml/min. Optical spectroscopy (UV-VIS) was accomplished using a PerkinElmer Lambda 900 spectrophotometer, while visualizing the LC confined in the porous membrane structure was carried out using a Leitz Orthoplan POL polarizing microscope at up to 1000× total magnification with reflected and transmitted illumination.

The permeability of the photo-switchable LC membranes to nitrogen was measured according to the variable volume-constant pressure method using a Barrer-type apparatus that was constructed in-house (FIG. 18). The permeation cell was designed in such a way that the membrane was irradiated directly. The permeation area was 0.5 cm$^2$.

10. Preparation of Other Materials

The mesogenic azobenzene dye 4-n-butyl-4'-methoxyazobenzene (BMAB) was prepared, as reported previously, from 4-n-butyl-4'-hydroxyazobenzene. Eutectic mixtures were prepared by dissolving the components in dichloromethane, filtering the solution by syringe through a 0.2-μm PTFE membrane, and evaporating the solvent. The compositions of low-molecular-weight LC mixtures Eutectic 1 and Eutectic 2 are discussed in greater detail above. Eutectic 1 consists of 86:14 w/w E7/(BMAB); Eutectic 2 consists of 60:40:15 w/w 4-n-pentylphenyl-4'-methoxybenzoate:4-n-pentylphenyl-4'-n-pentyloxybenzoate:4-ethoxy-4'-hexanoate azobenzene. Both PPMOB and PPPOB were synthesized in-house according to well-known synthetic procedures; EHAB was obtained from Eastman Chemical Co.

Liquid-crystal-imbibed track-etched membranes were prepared using Isopore membranes (Millipore Corp.) with pore sizes of 0.4, 5, and 10 μm. These membranes were preheated to 100° C. in vacuum (<10 mTorr) overnight to remove water and other volatiles. The membranes were imbibed through capillary action by immersing them in the LC at a temperature (75° C.) above its isotropic transition temperature. One hour sufficed for complete filling of the micropores. Excess LC was removed from the surface by carefully rubbing the membranes between two filter papers. For polarizing optical microscopy imaging (POM), all residual LC material was removed from the surface by spinning the membranes at 3000 rpm while washing with a few drops of hexane.

Cyanobiphenyl and azo-containing side-chain LC polyacrylates were prepared from synthesized mesogenic acrylates. The synthetic methodology was similar to that reported by Ringsdorf et al. Both acrylates were purified by repeated recrystallization from methanol. Polycarbonate membranes (400-nm pores) were imbibed with 94:6 w % cyanobiphenyl LC acrylate:azobenzene LC acrylate at a temperature of 85° C. The membranes were then carefully wiped using a clean room cloth, spun at 3000 rpm, washed with a few drops of hexane, heated to 70° C., and photocured using a mercury lamp (70 mW/cm$^2$ at 365 nm) for 3 min. A DSC thermogram was obtained on a bulk photopolymerized sample using a Perkin-Elmer DSC-7 with CCA-7 liquid nitrogen subambient accessory.

11. Permeation-Measurement Techniques

Permeation of a gas through a nonporous medium is generally understood in terms of the solution-diffusion mechanism. This process features three distinct steps: (1) sorption of the gas at the membrane entrance interface, (2) diffusion of the gas through the membrane, and (3) desorption at the exit interface. The term "permeation" refers to the complete three-step process, while the term "diffusion" applies only when the gas is a solute particle traveling through the membrane medium. In this model, three values describe the system: the steady-state permeation coefficient P, and the mean diffusion and solubility coefficients, D and S, respectively. The coefficient P is defined as the Fickian flux (J) times the membrane thickness (l) divided by the pressure difference (Δp) across the membrane, where the flux J equals the concentration gradient (concentration φ divided by length x) multiplied by a diffusion coefficient D:

$$J = -D\frac{d\phi}{dx}$$

$$P = \frac{J\,l}{\Delta p}.$$

The three coefficients are related by the equation:

$$P = D(\phi)S(\phi)$$

Two custom measurement tools were constructed to allow for permeability measurements at either variable pressure or variable volume with simultaneous sample irradiation (see FIGS. 15A, 15B, and 18). In the variable-volume technique, the membrane is allowed to equilibrate against atmosphere with an upstream positive pressure (200 to 800 Torr) and then the steady-state permeation coefficient is measured. The membrane is clamped between two gaskets, exposing the upper side of the membrane to atmosphere and therefore readily allowing irradiation; the lower side of the membrane is upstream of a large-volume surge tank and a manometer held with both of its arms at a constant pressure.

The following experimental procedure was used: The surge tank was filled via valve C with the desired gas pressure. Valve C is then closed and valves A and B were opened, introducing high pressure on the bottom side of the membrane. The membrane was allowed to reach equilibrium (10 to 15 min). Next, valve B was closed and the volume permeating through the membrane over time was measured. This experiment allows for only the determination of one parameter (P), but does allow for multiple irradiation and measurement cycles. In the variable-pressure constant-volume method, the membrane is clamped between two chambers, both of which are evacuated. Next, a pressure of gas from a surge tank is introduced onto one side of the membrane and the amount of gas that permeates through is measured using a capacitive pressure transducer. This method makes it possible to both measure permeation over time and to observe permeation prior to steady-state equilibrium being reached. From the non-equilibrium behavior at the beginning of the permeation experiment, the sorption and diffusion coefficients can be calculated from the time lag and membrane thickness before steady-state is reached:

$$D = \frac{l^2}{6\theta}.$$

One drawback of this method is that it is not suitable for repeated irradiation and cycling experiments because of the necessity to thoroughly evacuate the entire permeation manifold prior to an experimental run. Membranes can be irradiated, however, after evacuation is complete; therefore, the changes in all three coefficients can be evaluated as a function of irradiation and photo-switching.

Although the present invention has been described in connection with a preferred embodiment, it should be understood that modifications, alterations, and additions can be made to the invention without departing from the scope of the invention as defined by the claims.

What is claimed is:

1. A photo-switchable gas permeation membrane, said membrane comprising:
    a eutectic liquid crystalline mixture, said mixture comprising:
        a liquid crystal compound; and
        a mesogenic azobenzene dye;
    wherein the permeability of said membrane to gas is photo-switchable between a first state and a second state.

2. The photo-switchable gas permeation membrane of claim 1, wherein said membrane is more permeable to gas in said second state than in said first state.

3. The photo-switchable gas permeation membrane of claim 1, wherein said liquid crystal compound is selected from the group consisting of cyanobiphenyls, cyanobiphenyl acrylates, cyanobiphenyl polyacrylates, phenyl benzoates, phenylcyclohexanes, cyclocycohexanes, pyrimidines, and combinations thereof.

4. The photo-switchable gas permeation membrane of claim 3, wherein said liquid crystal compound is a cyanobiphenyl selected from the group consisting of 4-cyano-4'-n-pentylbiphenyl, 4-cyano-4'-n-heptyl biphenyl, 4-cyano-4'-n-oxyoctylbiphenyl, 4-cyano-4'-n-pentyl-p-terphenyl, and combinations thereof.

5. The photo-switchable gas permeation membrane of claim 3, wherein said liquid crystal compound is a phenyl benzoate selected from the group consisting of 4-n-pentylphenyl-4'-methoxybenzoate, 4-n-pentylphenyl-4'-n-pentyloxybenzoate, and combinations thereof.

6. The photo-switchable gas permeation membrane of claim 1, wherein said mesogenic azobenzene dye comprises 4-butyl-4'-methoxyazobenzene.

7. The photo-switchable gas permeation membrane of claim 1, wherein said mesogenic azobenzene dye comprises approximately 15% weight/weight ("w/w") of said eutectic liquid crystalline mixture.

8. The photo-switchable gas permeation membrane of claim 1, wherein said membrane comprises a material selected from the group consisting of polycarbonate, polyester, polyimide, and combinations thereof.

9. The photo-switchable gas permeation membrane of claim 1, wherein said eutectic liquid crystalline mixture is imbibed in said membrane.

10. The photo-switchable gas permeation membrane of claim 1, wherein said liquid crystalline mixture is dispersed into a host polymer solution and cast as a polymer-dispersed liquid crystal membrane.

11. The photo-switchable gas permeation membrane of claim 10, wherein said liquid crystalline mixture and said host polymer solution are mixed at a ratio of approximately 60:40 weight/weight ("w/w").

12. The photo-switchable gas permeation membrane of claim 1, wherein said membrane is treated with n-octyltriethoxylsilane.

13. A method of making a photo-switchable gas permeation membrane, said method comprising the step of adding a mixture of a liquid crystalline compound and a mesogenic azobenzene dye to a gas permeable membrane, wherein after adding said mixture to said membrane, the permeability of said membrane to gas is photo-switchable between a first state and a second state.

14. The method of claim 13, wherein said mixture is added by dispersing said mixture into a host polymer solution and casting the solution as a polymer-dispersed liquid crystal membrane.

15. The method of claim 13, wherein said membrane is more permeable to gas in said second state than in said first state.

16. The method of claim 13, wherein said liquid crystal compound is selected from the group consisting of cyanobiphenyls, phenyl benzoates, phenylcyclohexanes, cyclocycohexanes, pyrimidines, and combinations thereof.

17. The method of claim 13, wherein said mesogenic azobenzene dye comprises 4-butyl-4'-methoxyazobenzene.

18. The method of claim 13, wherein said membrane comprises a material selected from the group consisting of polycarbonate, polyester, polyimide, and combinations thereof.

19. The method of claim 13, further comprising the step of: treating said membrane with n-octyltriethoxylsilane.

* * * * *